US009600787B2

(12) United States Patent
Lopez et al.

(10) Patent No.: US 9,600,787 B2
(45) Date of Patent: Mar. 21, 2017

(54) DEFERRING AUTHENTICATION AND RESOURCE LOADING WHILE STARTING AN ENTERPRISE SYSTEM

(71) Applicant: TOSHIBA GLOBAL COMMERCE SOLUTIONS HOLDINGS CORPORATION, Tokyo (JP)

(72) Inventors: Luis Felipe Lopez, Raleigh, NC (US); Yongan Wang, Cary, NC (US)

(73) Assignee: Toshiba Global Commerce Solutions Holdings Corporation, Tokyo (JP)

(*) Notice: Subject to any disclaimer, the term of this patent is extended or adjusted under 35 U.S.C. 154(b) by 147 days.

(21) Appl. No.: 14/229,618

(22) Filed: Mar. 28, 2014

(65) Prior Publication Data
US 2014/0344336 A1 Nov. 20, 2014

Related U.S. Application Data

(60) Provisional application No. 61/824,351, filed on May 16, 2013, provisional application No. 61/929,544, filed on Jan. 21, 2014.

(51) Int. Cl.
| | | |
|---|---|---|
| *G06F 15/16* | (2006.01) | |
| *G06Q 10/06* | (2012.01) | |
| *G06F 17/30* | (2006.01) | |
| *H04L 29/08* | (2006.01) | |
| *G06Q 30/02* | (2012.01) | |
| *G06Q 20/20* | (2012.01) | |
| *G06Q 20/04* | (2012.01) | |
| *G07G 5/00* | (2006.01) | |

(52) U.S. Cl.
CPC ...... *G06Q 10/063* (2013.01); *G06F 17/30339* (2013.01); *G06Q 20/0453* (2013.01); *G06Q 20/209* (2013.01); *G06Q 30/0207* (2013.01); *G06Q 30/0238* (2013.01); *G07G 5/00* (2013.01); *H04L 29/08189* (2013.01); *H04L 67/10* (2013.01); *H04L 67/1012* (2013.01)

(58) Field of Classification Search
CPC . H04L 67/1012; H04L 67/1004; H04L 67/10; H04L 67/02; H04L 29/08189; H04L 29/08153; H04L 29/08135; H04L 29/0809
See application file for complete search history.

(56) References Cited

U.S. PATENT DOCUMENTS

| | | | |
|---|---|---|---|
| 6,128,279 A * | 10/2000 | O'Neil | ............... H04L 67/1008 370/229 |
| 6,216,153 B1 | 4/2001 | Vortriede | |
| 6,606,643 B1 | 8/2003 | Emens et al. | |

(Continued)

FOREIGN PATENT DOCUMENTS

WO 02060154 A1 8/2002

*Primary Examiner* — Nam Tran

(57) ABSTRACT

Embodiments provide techniques for deferring authentication and resource loading through the use of a local web server. One embodiment includes, upon receiving a request for remote web application content, at a local web server, from a client application, transmitting placeholder content to the client application. A remote web server is selected to fulfill the received request. Embodiments further include, upon determining that the remote web server is available to fulfill the received request, redirecting the client application to an address for the remote web server corresponding to the requested remote web application content.

17 Claims, 6 Drawing Sheets

(56) References Cited

U.S. PATENT DOCUMENTS

| | | |
|---|---|---|
| 6,965,938 B1 | 11/2005 | Beasley et al. |
| 7,177,897 B2 | 2/2007 | Manukyan |
| 7,660,756 B2 | 2/2010 | Nakamura et al. |
| 7,966,367 B2 | 6/2011 | Hsueh et al. |
| 2002/0010769 A1 | 1/2002 | Kippenhan et al. |
| 2002/0023141 A1* | 2/2002 | Yen .................... H04L 67/1002 709/217 |
| 2002/0178058 A1* | 11/2002 | Ritchie ................ G06Q 30/02 705/14.12 |
| 2005/0165931 A1* | 7/2005 | Shur .................. H04L 67/1008 709/226 |
| 2010/0138534 A1 | 6/2010 | Mutnuru et al. |
| 2010/0218248 A1* | 8/2010 | Nice .................. H04L 63/0272 726/12 |
| 2012/0210011 A1 | 8/2012 | Liu et al. |
| 2013/0198818 A1 | 8/2013 | Hitchcock et al. |

\* cited by examiner

DEFERRING AUTHENTICATION AND RESOURCE LOADING WHILE STARTING AN ENTERPRISE SYSTEM

CROSS-REFERENCE TO RELATED APPLICATIONS

This application claims priority to U.S. Provisional Patent Application 61/824,351, filed May 16, 2013 and to U.S. Provisional Patent Application 61/929,544, filed Jan. 21, 2014. The aforementioned provisional patent applications are herein incorporated by reference in their entirety.

BACKGROUND

The present disclosure relates to web applications, and more specifically, to techniques for deferring authentication and resource loading for a web application through the use of a local web server.

Today, many applications are designed to load resources from a remote server on the Internet. One advantage to such a design is that it allows for application content to be dynamically updated, without requiring each client application accessing the remote content to be individually updated. Moreover, such a design allows for a relatively thin client application, since the graphics, logic and other content can be loaded from the remote server. For example, the client application could consist primarily of a web browser configured to load web pages retrieved from the remote web server. In order to update such an application, developers can merely update the web pages on the remote web server, without having to update the web browser component.

In order to connect to the remote server, the client application may need to resolve the remote server's domain name to a specific IP address for the remote server. In some cases, multiple remote servers may exist and the domain name resolution process can return a list of multiple IP addresses for the multiple host servers. Upon receipt of the list of IP addresses in the local DNS resolver, the client application could select the first IP address in the list and could attempt to connect to the remote server using the selected address. However, if the client application fails to connect with the remote server using the IP addresses in the list (e.g., if a network connection used by the client application is experiencing problems), the client application may display an error message. In many situations, such an error message may provide an error code and a brief explanation of the error code. However, such error codes can appear cryptic to an unsophisticated user, which can diminish the user's experience of the client application and needlessly waste Internet resources (e.g., by making repeated requests to an unavailable IP address when a suitable alternative IP address is available).

SUMMARY

According to one embodiment, a method is provided for deferring authentication and resource loading through the use of a local web server. The method includes, upon receiving a request for remote web application content, at a local web server, from a client application, transmitting placeholder content to the client application. A remote web server is selected to fulfill the received request. Embodiments further include, upon determining that the remote web server is available to fulfill the received request, redirecting the client application to an address for the remote web server corresponding to the requested remote web application content.

Other embodiments provide a system and computer-readable medium containing programs that, when executed, perform the aforementioned method.

DETAILED DESCRIPTION

Figure 1:
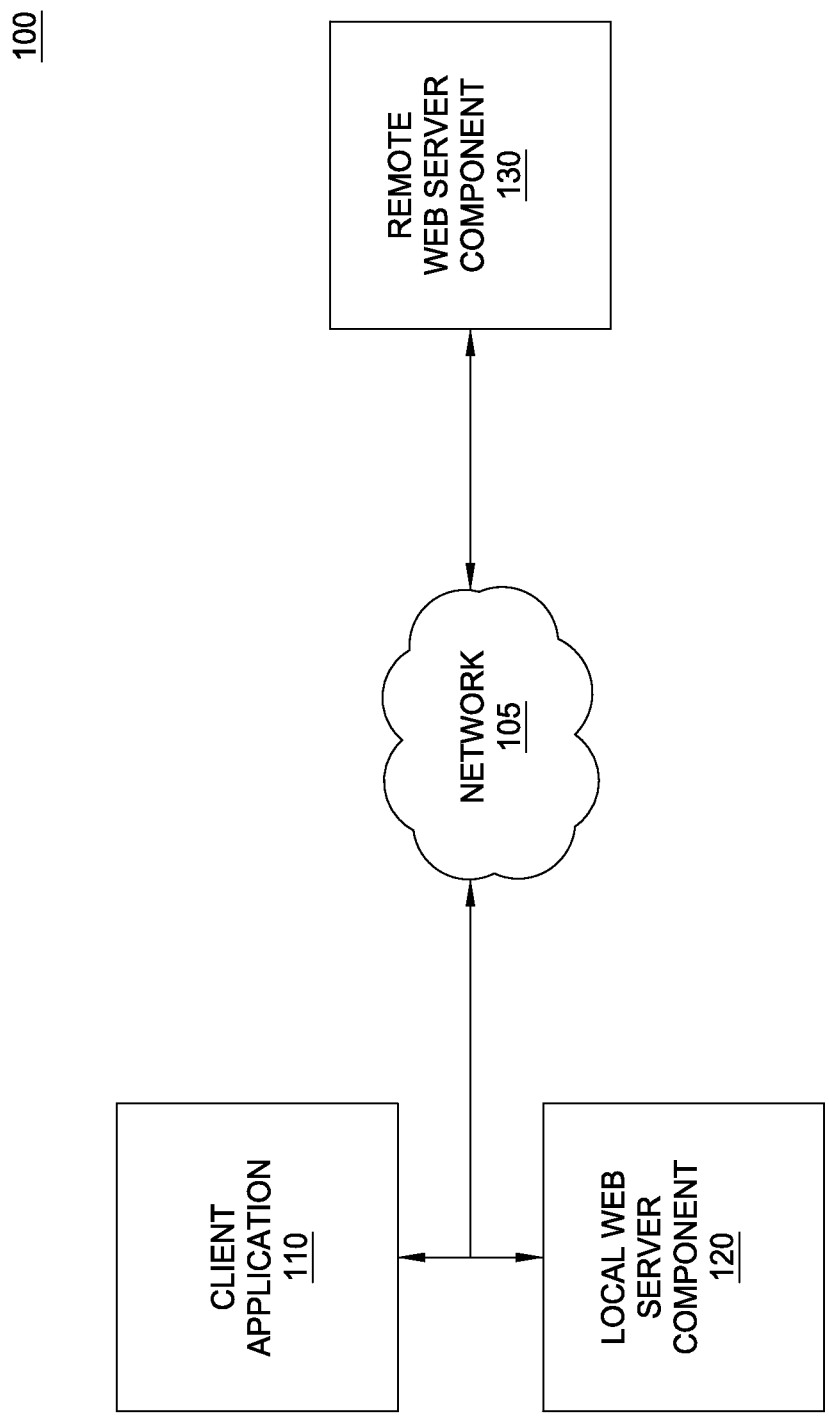
FIG. 1 is a block diagram illustrating a client application, a local web server component and a remote web server component, connected via a network, according to one embodiment described herein.

While dynamically loading content from a remote server as part of a client application provides many advantages, such techniques can also introduce new challenges as well. For instance, such applications may lose some or all functionality in the event that the remote web server goes offline or otherwise becomes unavailable. As an example, if a network connection used for communications between the client application and the remote server goes offline, the client application may be unable to retrieve new content (e.g., web pages) from the remote server. In such a situation, the application could display an error message (e.g., "404: Not Found") or could display a blank screen. However, unsophisticated users may not understand the significance of such an error message. Moreover, even if users do understand the significance of such an error message, the display of such a cryptic error message can negatively affect the overall appearance of the client application. Additionally, in the event the user interface is loaded from the remote server, such a user interface can appear to load sluggishly (e.g., depending on the speed of the network connection connecting the client application with the remote server) also degrading the appearance of the client application's user interface As such, embodiments provide techniques for deferring authentication and resource loading through the use of a local web server. One embodiment includes, upon receiving a request for remote web application content, at a local web server, from a client application, transmitting placeholder content to the client application. For example, the client application could execute on a particular computing device, and the local web server could be a web server residing on a separate computing device on a local area network (LAN)

that connects the particular computing device with the separate computing device. As another example, both the client application and the local web server could reside on the same computing device. Here, the placeholder content represents content (e.g., one or more web pages) that are loaded by the client application until the requested remote web application content can be loaded. For example, the placeholder content could be one or more web pages that display a loading screen and a product logo for the client application.

Logic on the local web server can then select a remote web server to fulfill the received request. For example, the local web server could be configured with information specifying addresses (e.g., uniform resource locator (URL) addresses) for multiple distinct remote web servers from which the requested remote web application content can be retrieved, and could select one of the multiple remote web servers to fulfill the request. In one embodiment, the logic on the local web server could employ a load balancing algorithm in selecting one of the remote web servers. For instance, the logic could retrieve a measure of workload for each of the multiple remote web servers and could then use a load balancing algorithm to select the remote web server that currently has the lowest workload.

The logic on the local web server can, upon determining that the remote web server is available to fulfill the received request, redirect the client application to an address for the remote web server corresponding to the requested remote web application content. For instance, to determine that the remote web server is available, the logic on the local web server could transmit a message (e.g., a ping message) to the remote web server and could initiate a timer set to expire after a predetermined period of time. If the logic on the local web server then receives an acknowledgement message from the remote web server before the timer expires, the logic could determine that the remote web server is available. If the timer expires before any acknowledgement message is received, the logic could determine that the remote web server is unavailable. In such an event, the logic on the local web server could select another remote web server to fulfill the request or, in the event that no known remote web servers are available, could continue polling the remote web server(s) until one becomes available.

FIG. 1 is a block diagram illustrating a client application, a local web server component and a remote web server component, connected via a network, according to one embodiment described herein. As shown, the system 100 includes a client application 110 and a local web server component 120, connected to a remote web server component 130 via network 105. For instance, the client application 110 and the local web server component 120 could reside on a computing device (e.g., a point of sale terminal) and could connect to the remote web server 130 via the network 105 (e.g., the Internet).

Generally, the client application 110 represents any application configured to load at least a portion of content from the remote web server component 130. For instance, the client application 110 could load its user interface (or a portion of its user interface) as a web page from the remote web server component 130. While loading a portion of content for the client application 110 from the remote web server component 130 provides numerous advantages, it presents new challenges as well. For example, the client application 110 could appear sluggish upon start-up if the entirety of its user interface needs to be loaded from the remote web server component 130.

As such, the client application 110 can transmit a request for remote web application content to the local web server component 120. Here, the local web server component 120 is not configured to provide the requested remote web application content to the client application 110, but rather is configured to provide placeholder content to the client application 110 while selecting a remote web server (e.g., the remote web server component 130) for the client application 110 to load the requested remote web application content from. For example, the local web server component 120 could transmit one or more web pages to the client application 110 as the placeholder content. The one or more web pages could, for instance, display a splash screen containing the product logo for the client application 110 and could further contain a progress bar with the text "Now Loading . . . ."

Additionally, the local web server component 120 could retrieve data specifying multiple remote web servers from which the requested remote web application content can be retrieved and their corresponding addresses. The local web server component 120 could select one of the remote web servers that is currently available to fulfill the client application's 110 request, and could redirect the client application 110 to the address corresponding to the selected remote web server. For example, the local web server component 120 could select the remote web server component 130 to fulfill the request and could transmit a URL corresponding to the remote web server component 130 to the client application 110 as part of a redirect message. Such a redirect message could then cause a browser component of the client application 110 to load one or more web pages from the remote web server component 130 at the specified address, in place of the placeholder content. Doing so allows the client application 110 to quickly load content from the local web server component 120, allowing the client application 110 to feel more responsive to users.

Figure 2:
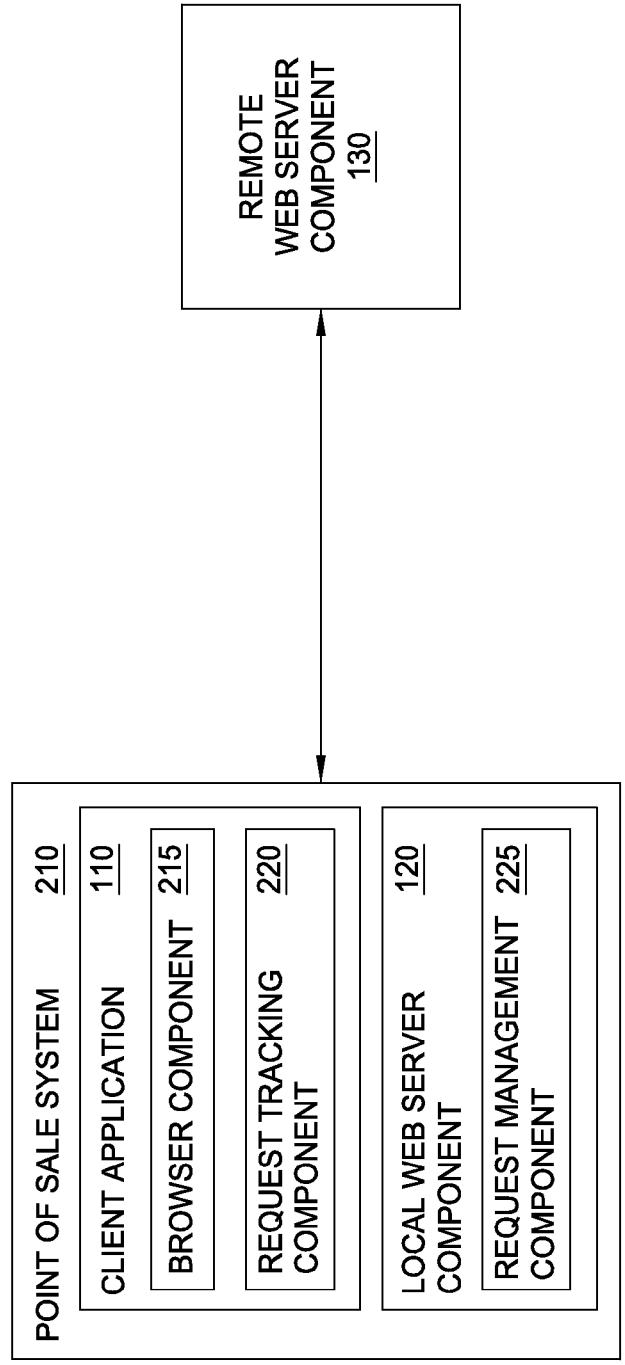
FIG. 2 is a block diagram illustrating a point of sale system connected to a remote web server component, according to one embodiment described herein.

FIG. 2 is a block diagram illustrating a point of sale system connected to a remote web server component, according to one embodiment described herein. As shown, the system 200 includes a point of sale system 210 connected to a remote web server component 130. The point of sale system 210 includes a client application 110 and a local web server component 120. The client application 110 includes a browser component 215 and a request tracking component 220. Additionally, the local web server component 120 contains a request management component 225. Generally, the request management component 225 is configured to receive requests for remote web application content from the client application 110 and to provide placeholder content to the client application 110 while selecting an available remote web server to fulfill the client's request. For instance, the request management component 225 could transmit one or more web pages to be loaded by the browser component 215 of the client application 110 and, upon determining that the remote web server component 130 is available to fulfill the request, could redirect the browser component 215 to an address for the remote web application content on the remote web server component 130.

In one embodiment, the request management component 225 is configured to select one of multiple different remote web servers capable of fulfilling the client application's 110 request through the use of a load balancing algorithm. Generally, any type of load balancing algorithm can be used, with examples include (without limitation) round robin load balancing, scheduling algorithms (i.e., algorithms that consider the current workload of the remote web servers) and so on. Advantageously, doing so helps to ensure that load is evenly distributed across the multiple remote web servers.

In some embodiments, it may be preferable for all of the point of sale systems 210 within a given location (e.g., a retail store) to connect to the same remote web server component 130. For instance, having all of the point of sale systems 210 connect to a single remote web server component 130 could avoid reconciliation and/or synchronization operations that would need to be performed, had the point of sale systems 210 connected to multiple different remote web server components 130. As such, upon redirecting the client application 110 on the point of sale system 210 to an address corresponding to the remote web server component 130, the request management component 225 could redirect all of the point of sale systems within the local area network to the address corresponding to the remote web server component 130. Doing so helps to ensure that transaction data relating to transactions processed on the point of sale systems stays consolidated on the remote web server component 130 (i.e., as opposed to multiple different remote web servers).

The request tracking component 220 is generally configured to track requests transmitted to the remote web server component 130 and to determine when the remote web server component 130 has become unavailable, based on the tracked requests. For example, the client application 110 could routinely transmit Asynchronous JavaScript and XML (AJAX) messages to the remote web server component 130. Upon detecting that the client application 110 has transmitted an AJAX message to the remote web server component 130, the request tracking component 220 could initiate a timer configured to expire after a predetermined period of time. If the request tracking component 220 determines that the timer has expired before any acknowledgment message is received from the remote web server component 130, the request tracking component 220 could determine that the remote web server component 130 has become unavailable. In such a case, the request tracking component 220 could transmit a request to the local web server component 120 for remote web application content. The request management component 225 could then provide placeholder content for the browser component 215 to load, and the request management component 225 could subsequently redirect the client application 110 to a currently available remote web server capable of providing the requested content. Advantageously, doing so allows the client application 110 to gracefully handle a loss of connectivity with the remote web server 130.

Figure 3:
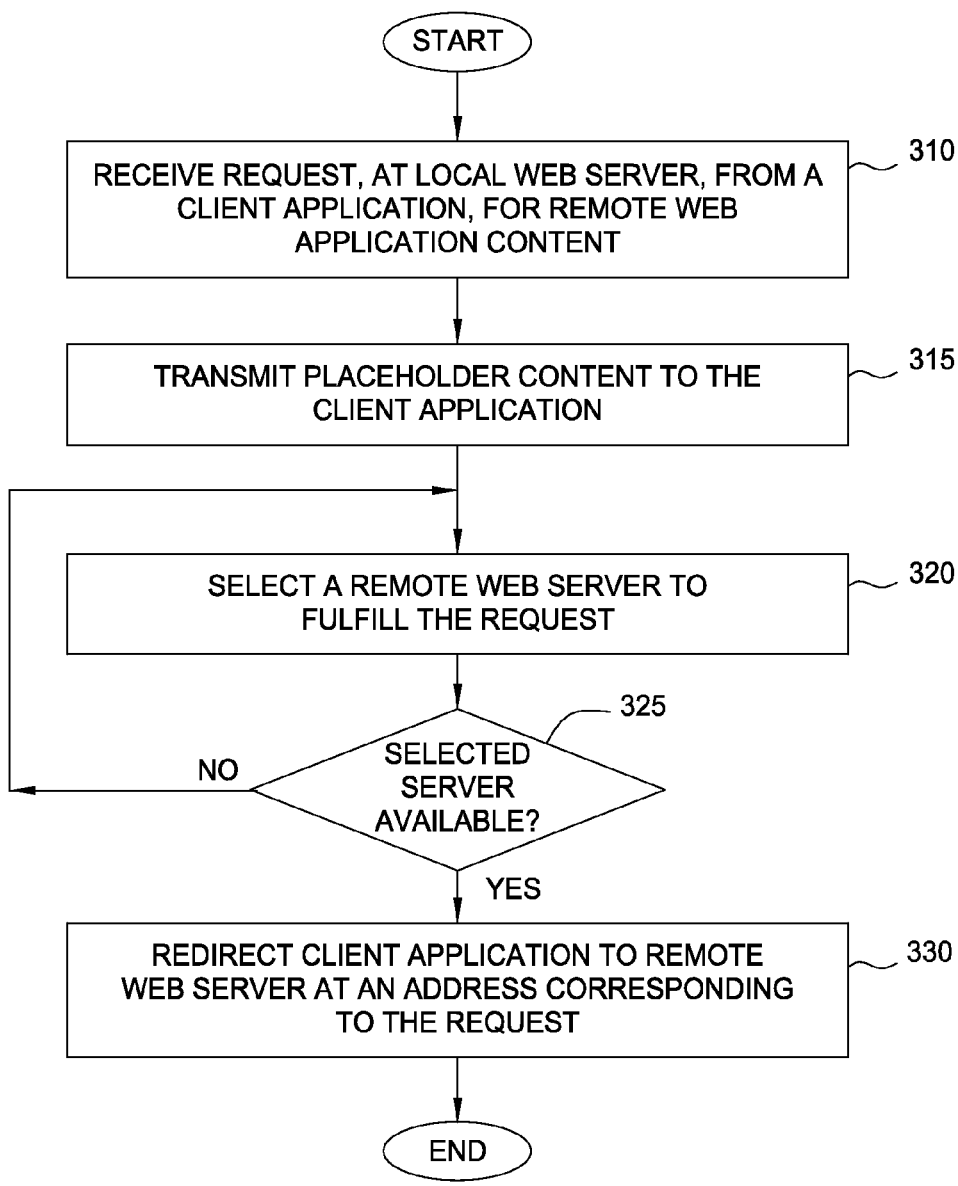
FIG. 3 is a flow diagram illustrating a method for deferring authentication and resource loading from a remote web server using a local web server, according to one embodiment described herein.

FIG. 3 is a flow diagram illustrating a method for deferring authentication and resource loading from a remote web server using a local web server, according to one embodiment described herein. As shown, the method 300 begins at block 310, where a request management component 225 receives a request, at a local web server, from a client application, for remote web application content. For example, the request could be a Hypertext Transfer Protocol (HTTP) message requesting content at a particular address on the local web server. Upon receiving the request, the request management component 225 transmits placeholder content to the client application (block 315). For example, the placeholder content could include one or more web pages that provide a splash screen for the client application.

The request management component 225 also selects a remote web server to fulfill the client application's request (block 320). If the request management component 225 is only configured to recognize a single remote web server capable of fulfilling the request, the request management component 225 could select the single remote web server. In the event the request management component 225 is configured to recognize multiple remote web servers each capable of fulfilling the request, the request management component 225 could select one of the multiple remote web servers to fulfill the request (e.g., using a load balancing algorithm).

Once a remote web server is selected, the request management component 225 determines whether the selected remote web server is available (block 325). For instance, the request management component 225 could transmit a ping message to an address corresponding to the remote web server and, if the request management component 225 receives a response to the ping message from the remote web server within a predetermined period of time, the request management component 225 could determine that the remote web server is available. In this case, the request management component 225 redirects the client application to the remote web server at an address corresponding to the requested remote web application content (block 330), and the method 300 ends. If instead no acknowledgement message is received and the predetermined period of time expires, the request management component 225 could determine that the selected remote web server is not currently available. In this case, the method 300 returns to block 320, where the request management component 225 selects a remote web server to fulfill the request. For instance, the request management component 225 could be configured to select a different remote web server after determining that the first selected remote web server is unavailable.

Figure 4:
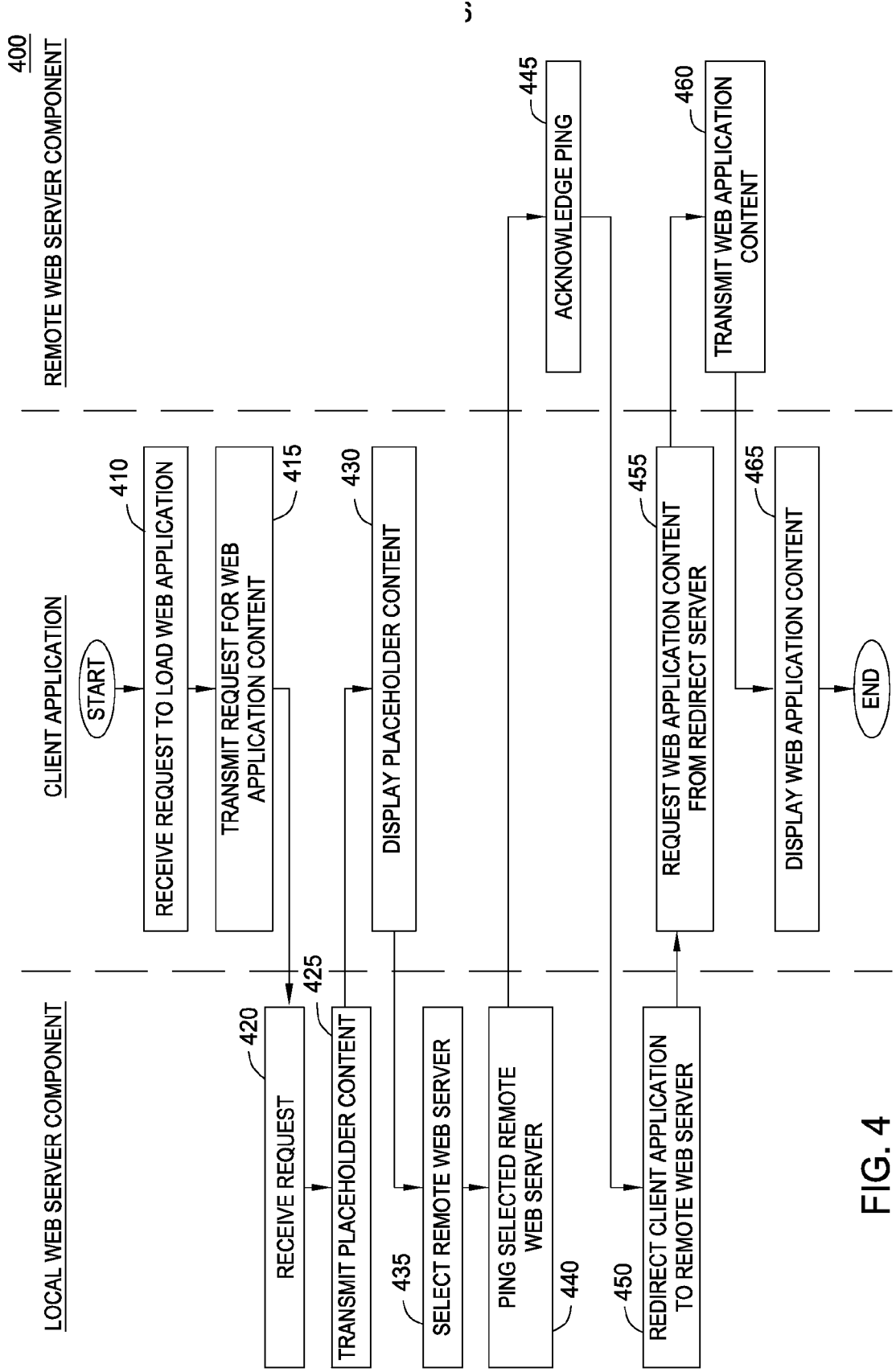
FIG. 4 is a flow diagram illustrating a method for deferring authentication and resource loading from a remote web server using a local web server, according to one embodiment described herein.

FIG. 4 is a flow diagram illustrating a method for deferring authentication and resource loading from a remote web server using a local web server, according to one embodiment described herein. As shown, the method 400 begins at block 410, where a client application receives a request to load a web application. For instance, such a request could be received responsive to a user launching the client application. The client application then transmits a request for web application content to the local web server component (block 415). The local web server component receives the request (block 420) and transmits placeholder content to the client application (block 425). Such placeholder content could comprise, for example, one or more web pages configured to display a loading screen for the client application. Upon receiving the placeholder content, the client application outputs the placeholder content for display (block 430). For instance, the client application could render the received web pages in order to display the loading screen.

The local web server component then selects a remote web server for use in fulfilling the client application's request (block 435) and pings the selected remote web server to determine whether the remote web server is currently available to fulfill the request (block 440). Upon receiving the ping message, the remote web server component acknowledges the ping message (block 445). Responsive to receiving the acknowledgement from the remote web server component, the local web server component determines that the remote web server component is currently available for fulfilling the request and redirects the client application to an address corresponding to the remote web server (e.g., a particular URL at which the requested web application content can be retrieved from the remote web server component) (block 450).

Upon receiving the redirect message, the client application transmits a request for the web application content from the remote web server component, using the address specified in the redirect message (block 455). The remote web server component receives the request and transmits the requested web application content to the client application (block 460). Responsive to receiving the web application content, the client application outputs the web application content for display (block 465) and the method 400 ends.

Figure 5:
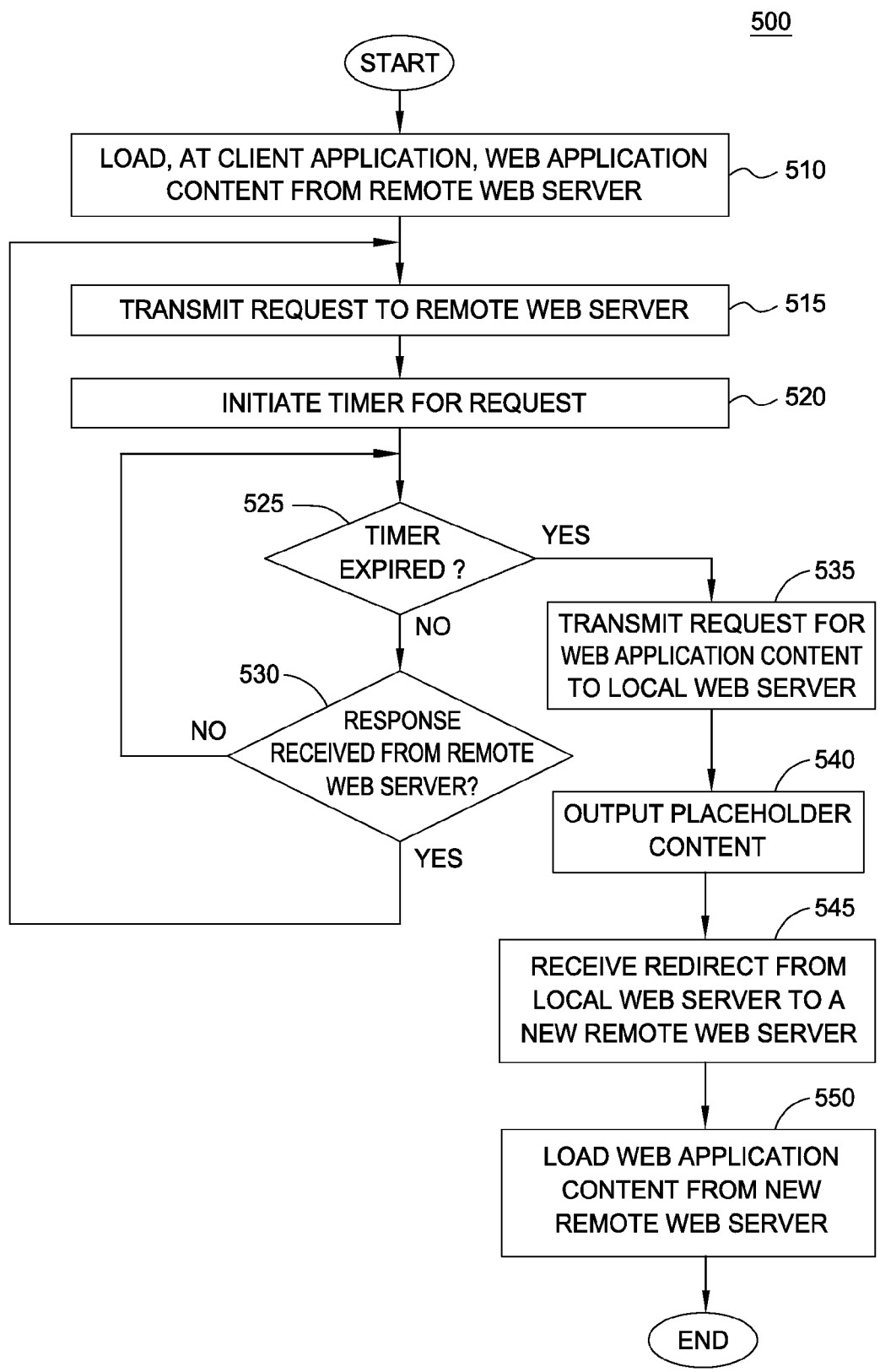
FIG. 5 is a flow diagram illustrating a method for detecting and managing a loss of connectivity to a remote web server, according to one embodiment described herein.

FIG. 5 is a flow diagram illustrating a method for detecting and managing a loss of connectivity to a remote web server, according to one embodiment described herein. As shown, the method 500 begins at block 510, where a client application loads web application content from a remote web server. For example, the method 500 could take place after an iteration of the method 500, where the block 510 of method 500 corresponds to block 465 of the method 400. At some subsequent point in time, the client application transmits a request to the remote web server (block 515). For example, the request could be an AJAX message transmitted from the client application to the remote web server. More generally, however, it is contemplated that any type of message can be transmitted, consistent with the functionality described herein.

Upon transmitting the request, the request tracking component 220 initiates a timer configured to expire after a predetermined period of time (block 520). The request tracking component 220 then determines whether said timer has expired (block 525), and if not, the request tracking component 220 determines whether a response corresponding to the request has yet been received from the remote web server (block 530). If a response is received before the timer expires, the method 500 returns to block 515, where the client application at some later point in time transmits another request to the remote web server. Of course, it is contemplated that requests and their corresponding responses can be transmitted between the client application and the remote web server asynchronously (e.g., multiple requests and their corresponding timers could be pending simultaneously), and the depicted method 400 is provided for illustrative purposes only.

In the event the request tracking component 220 determines the timer has expired before the corresponding response is received, the request tracking component 220 transmits a request for web application content to a local web server (block 535). Responsive to transmitting the request to the local web server, the client application receives and outputs placeholder content (block 540) and subsequently receives a redirect request from the local web server that redirects the client application to an address corresponding to a new remote web server (block 545). The client application loads the web application content from the new remote web server at an address specified in the redirect request (block 550) and the method 500 ends. For instance, in one embodiment, the method 400 could be performed once the request tracking component 220 determines the timer has expired before the corresponding response has been received.

Figure 6:
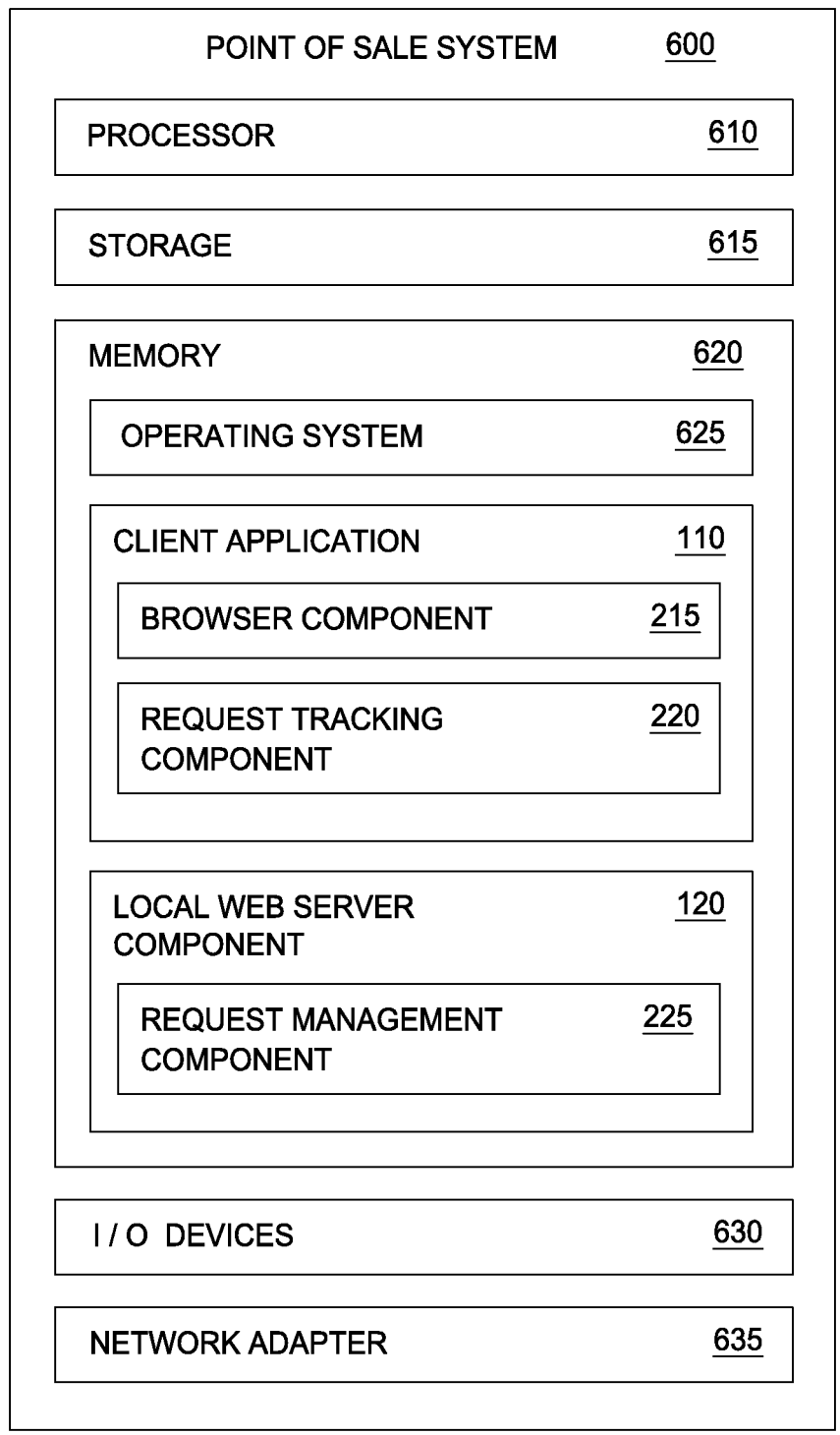
FIG. 6 is a block diagram illustrating a point of sale system configured with a client application and a local web server component, according to one embodiment described herein.

FIG. 6 is a block diagram illustrating a point of sale system configured with a client application and a local web server component, according to one embodiment described herein. As shown, the point of sale system 600 includes several hardware components ordinarily included in a general purpose computing system, such as central processing unit (CPU) 610, storage 615 and memory 620. CPU 610 may include any processing element capable of performing the functions described herein. While depicted as a single element within the point of sale system 600, CPU 610 is intended to represent a single processor, multiple processors, a processor or processors having multiple cores, as well as combinations thereof. Additionally, storage 615 represents any storage medium communicatively coupled to the point of sale system 600, which can include storage devices present within the point of sale system 600 (e.g., an internal disk drive) as well as external and remote storage devices accessible by the point of sale system 600.

The memory 620 may be volatile or non-volatile memory, and may include a random access memory (RAM), Flash memory, cache, disk drives, solid state drives, and the like. Although shown as a single entity, the memory 620 may be divided into different memory elements, such as RAM and one or more hard disk drives. Memory 620 contains an operating system 625, a client application 110 and a local web server component 120. The operating system 625 generally represents any operating system, with examples including versions of Microsoft® Windows®, Linux® and Unix® distributions, and so on. The client application 110 includes a browser component 215 and a request tracking component 220. The local web server component 120 includes a request management component 225.

As discussed above, the request tracking component 220 could, upon transmitting a request to a remote web server, initiate a timer configured to expire after a predetermined period of time. Additionally, upon determining that the timer has expired before a response message corresponding to the request has been received from the remote web server, the request tracking component 220 could transmit a request for remote web application content to a local web server. The request tracking component 220 could then receive placeholder content from the local web server and output the placeholder content for display. The request tracking component 220 could also receive a redirect message from the local web server, specifying address information corresponding to a second remote web server from which the remote web application content can be retrieved.

Additionally, the request management component 225 can be configured to, upon receiving a request for remote web application content, at a local web server, from a client application, transmit placeholder content to the client application. The request management component 225 can further select a remote web server to fulfill the received request. The request management component 225 could also, upon determining that the remote web server is available to fulfill the received request, redirect the client application to an address for the remote web server corresponding to the requested remote web application content.

The descriptions of the various embodiments described herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of embodiments described herein may be embodied as a system, method or computer program product. Accordingly, such aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium is defined herein as any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments described herein may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described above with reference to flowchart illustrations and/or block diagrams of methods, apparatus (systems) and computer program products according to various embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, one or more remote web servers can reside within a cloud computing environment. The request management component 225 could determine that one of the remote web servers is available with respect to a particular client application and could redirect the client application to an address corresponding to the remote web server within the cloud computing environment. Doing so allows the client application to access content on the remote web server from any computing system attached to a network connected to the cloud (e.g., the Internet).

The flowchart and block diagrams in the Figures illustrate the architecture, functionality, and operation of possible implementations of systems, methods and computer program products according to various embodiments described herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to particular embodiments, other and further embodiments may be devised without departing from the basic scope thereof, and the scope thereof is determined by the claims that follow.

What is claimed is:

1. A method, comprising:
   upon receiving a request for remote web application content, at a local web server, from a client application, transmitting placeholder content to the client application;
   selecting, by operation of one or more computer processors, a remote web server to fulfill the received request;
   upon determining that the remote web server is available to fulfill the received request, redirecting the client application to an address for the remote web server corresponding to the requested remote web application content; and
   responsive to receiving a notification from the client application indicating the remote web server is unavailable:
      responsive to receiving a second request for the remote web application content, at the local web server, from the client application, re-transmitting the placeholder content to the client application, wherein the client application is configured to transmit the second request responsive to not receiving an acknowledgement message from the remote web server within a predetermined period of time;
      selecting a second remote web server to fulfill the second request; and
      redirecting the client application to a second address for the second remote web server corresponding to the requested remote web application content, wherein the second remote web server is distinct from the remote web server.

2. The method of claim 1, wherein selecting a remote web server to fulfill the received request further comprises:
   identifying a plurality of remote web servers capable of providing the remote web application content; and
   selecting one of the plurality of remote web servers to fulfill the received request.

3. The method of claim 2, wherein selecting a remote web server to fulfill the received request further comprises:
   determining a current load for each of the plurality of remote web servers; and
   selecting one of the plurality of remote web servers using a load balancing algorithm, based on the determined current load for each of the remote web servers.

4. The method of claim 1, further comprising:
   upon determining that the remote web server is available to fulfill the received request, redirecting all other client applications on a local network to an address for the remote web server corresponding to the requested remote web application content.

5. The method of claim 1, wherein determining that the remote web server is available to fulfill the received request further comprises:
   transmitting a message to the remote web server;
   initiating a timer configured to expire after a predetermined period of time;
   upon receiving an acknowledgement message to the transmitted message before the timer expires, determining that the remote web server is available to fulfill the request; and
   upon determining that the timer has expired before the acknowledgement message was received, determining that the remote web server is not available to fulfill the request.

6. The method of claim 1, wherein the placeholder content comprises one or more web pages configured to display a loading screen for the client application, wherein the local web server and the client application reside on a first local area network, and wherein the remote web server is not a member of the first local area network.

7. A system, comprising:
   a processor; and
   a memory containing a program that, when executed by the processor, performs an operation comprising:
      upon receiving a request for remote web application content, at a local web server, from a client application, transmitting placeholder content to the client application;
      selecting a remote web server to fulfill the received request;
      upon determining that the remote web server is available to fulfill the received request, redirecting the client application to an address for the remote web server corresponding to the requested remote web application content; and
      responsive to receiving a notification from the client application indicating the remote web server is unavailable:
         responsive to receiving a second request for the remote web application content, at the local web server, from the client application, re-transmitting the placeholder content to the client application, wherein the client application is configured to transmit the second request responsive to not receiving an acknowledgement message from the remote web server within a predetermined period of time;
         selecting a second remote web server to fulfill the second request; and
         redirecting the client application to a second address for the second remote web server corresponding to the requested remote web application content, wherein the second remote web server is distinct from the remote web server.

8. The system of claim 7, wherein selecting a remote web server to fulfill the received request further comprises:
   identifying a plurality of remote web servers capable of providing the remote web application content; and
   selecting one of the plurality of remote web servers to fulfill the received request.

9. The system of claim 8, wherein selecting a remote web server to fulfill the received request further comprises:
   determining a current load for each of the plurality of remote web servers; and
   selecting one of the plurality of remote web servers using a load balancing algorithm, based on the determined current load for each of the remote web servers.

10. The system of claim 7, the operation further comprising:
    upon determining that the remote web server is available to fulfill the received request, redirecting all other client applications on a local network to an address for the remote web server corresponding to the requested remote web application content.

11. The system of claim 7, wherein determining that the remote web server is available to fulfill the received request further comprises:
   transmitting a message to the remote web server;
   initiating a timer configured to expire after a predetermined period of time;
   upon receiving an acknowledgement message to the transmitted message before the timer expires, determining that the remote web server is available to fulfill the request; and
   upon determining that the timer has expired before the acknowledgement message was received, determining that the remote web server is not available to fulfill the request.

12. The system of claim 7, wherein the placeholder content comprises one or more web pages configured to display a loading screen for the client application, wherein the local web server and the client application reside on a first local area network, and wherein the remote web server is not a member of the first local area network.

13. A non-transitory computer-readable medium containing a program that, when executed, performs an operation comprising:
   upon receiving a request for remote web application content, at a local web server, from a client application, transmitting placeholder content to the client application;
   selecting a remote web server to fulfill the received request;
   upon determining that the remote web server is available to fulfill the received request, redirecting the client application to an address for the remote web server corresponding to the requested remote web application content; and
   responsive to receiving a notification from the client application indicating the remote web server is unavailable:
      responsive to receiving a second request for the remote web application content, at the local web server, from the client application, re-transmitting the placeholder content to the client application, wherein the client application is configured to transmit the second request responsive to not receiving an acknowledgement message from the remote web server within a predetermined period of time;
      selecting a second remote web server to fulfill the second request; and
      redirecting the client application to a second address for the second remote web server corresponding to the requested remote web application content, wherein the second remote web server is distinct from the remote web server.

14. The non-transitory computer-readable medium of claim 13, wherein selecting a remote web server to fulfill the received request further comprises:
   identifying a plurality of remote web servers capable of providing the remote web application content; and
   selecting one of the plurality of remote web servers to fulfill the received request.

15. The non-transitory computer-readable medium of claim 14, wherein selecting a remote web server to fulfill the received request further comprises:
   determining a current load for each of the plurality of remote web servers; and
   selecting one of the plurality of remote web servers using a load balancing algorithm, based on the determined current load for each of the remote web servers.

16. The non-transitory computer-readable medium of claim 15, the operation further comprising:
   upon determining that the remote web server is available to fulfill the received request, redirecting all other client applications on a local network to an address for the remote web server corresponding to the requested remote web application content.

17. The non-transitory computer-readable medium of claim 13, wherein determining that the remote web server is available to fulfill the received request further comprises:
   transmitting a message to the remote web server;
   initiating a timer configured to expire after a predetermined period of time;
   upon receiving an acknowledgement message to the transmitted message before the timer expires, determining that the remote web server is available to fulfill the request; and
   upon determining that the timer has expired before the acknowledgement message was received, determining that the remote web server is not available to fulfill the request.

* * * * *